United States Patent [19]

Hedgespeth

[11] 4,348,143
[45] Sep. 7, 1982

[54] LARGE ROUND HAY BALE MOVER

[76] Inventor: Clofford L. Hedgespeth, Rte. 1, P.O. Box 29, Finley, Ky. 42736

[21] Appl. No.: 202,144

[22] Filed: Oct. 30, 1980

Related U.S. Application Data

[63] Continuation of Ser. No. 2,572, Jan. 11, 1979, abandoned.

[51] Int. Cl.³ .................... A01D 87/12; B60P 1/14
[52] U.S. Cl. .................................. 414/24.5; 414/485
[58] Field of Search .................. 414/24.5, 24.6, 482, 414/485, 684, 721, 911, 434, 435, 436

[56] References Cited

U.S. PATENT DOCUMENTS

| | | | |
|---|---|---|---|
| 2,412,643 | 12/1946 | Maki | 414/721 |
| 2,468,297 | 4/1949 | Jones | 414/436 |
| 3,357,579 | 12/1967 | Goodsell | 414/485 |
| 3,877,595 | 4/1975 | Edelman | 414/24.5 |
| 3,944,095 | 3/1976 | Brown | 414/911 X |
| 4,023,693 | 5/1977 | Priefert | 414/24.5 |
| 4,062,454 | 12/1977 | Priefert | 414/24.5 |
| 4,103,831 | 8/1978 | Laudemann et al. | 414/911 X |
| 4,215,963 | 8/1980 | Doner | 414/24.5 |

Primary Examiner—Leslie J. Paperner

[57] ABSTRACT

A large round hay bale trailer having a fork lift cradle pivotally mounted on a two wheel trailer frame, the cradle being formed by pipe having 90° vertical and horizontal bends to provide fork, back support and horizontal connecting elements. Laterally extending pipe sections welded to the cradle pipe provide pivotal bearings for a horizontal wheel axle pipe to which trailer frame elements are also secured.

7 Claims, 4 Drawing Figures

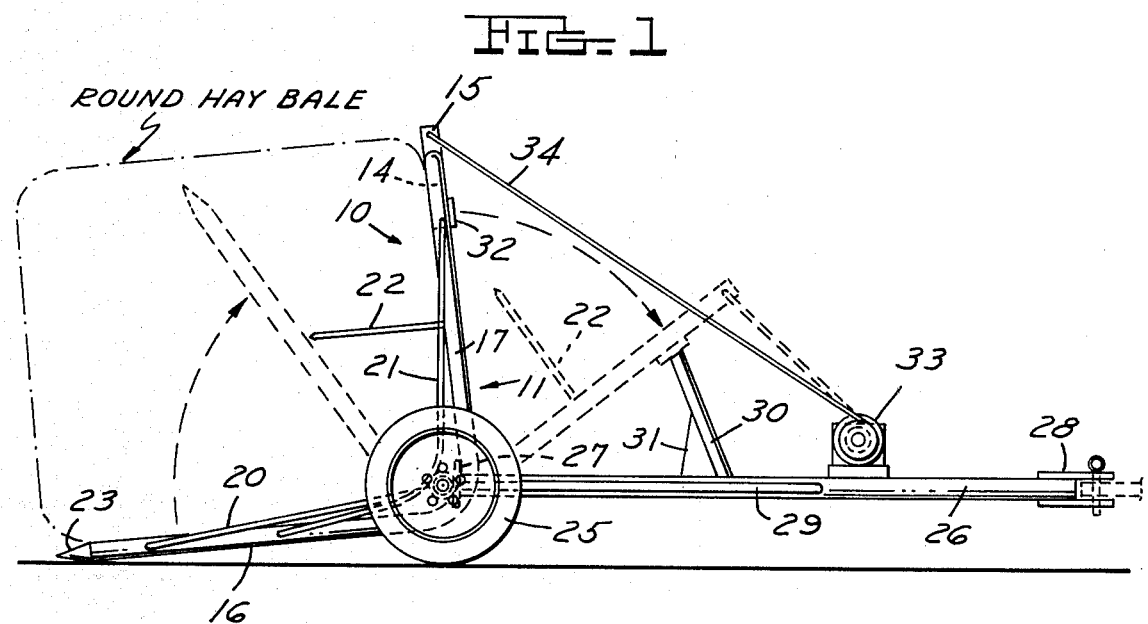
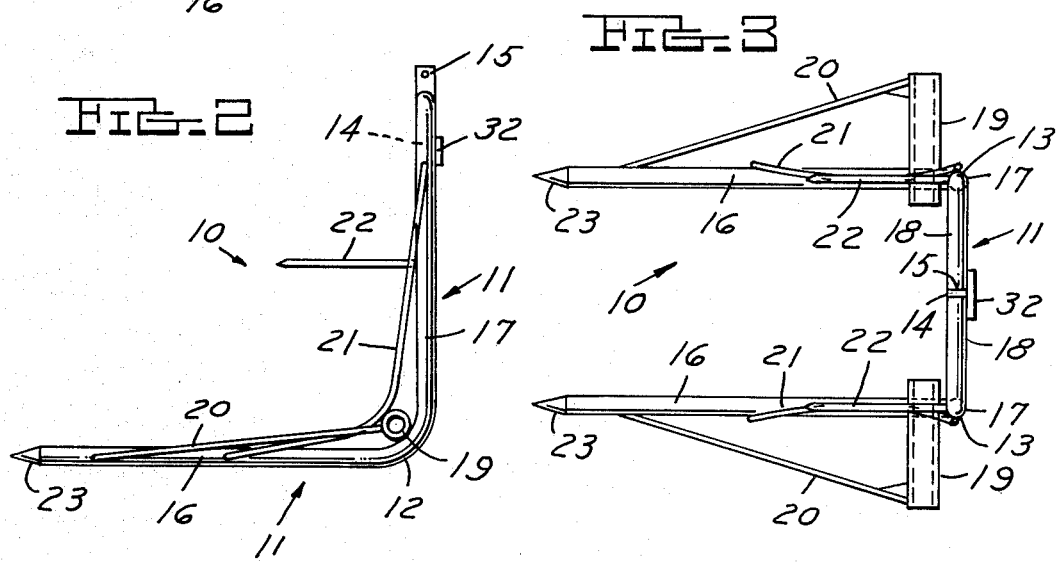
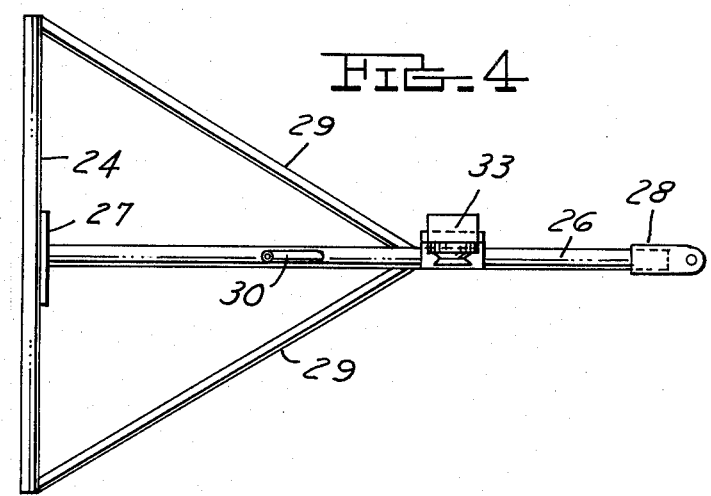

LARGE ROUND HAY BALE MOVER

This application is a continuation of application Ser. No. 002,572 filed Jan. 11, 1979, now abandoned.

BACKGROUND OF THE INVENTION

Large round hay bales, each of which may weigh thousands of pounds, are sometimes transported individually on a special purpose trailer having a cradle with fork elements adapted to extend under a bale and a back support. The cradle may be pivoted on a two wheel trailer frame for transport by a pick-up truck or small tractor. Problems have been encountered with inadequate structural rigidity, complexity of construction and bolt pivots subject to wear and failure under the shock loading of heavy loads transported over rough terrain. Inadequate ground clearance of the fabricated constructions currently in use have also been a problem.

Prior art apparatus for handling a large hay bale as disclosed in U.S. Pat. No. 4,023,693 employs a relatively complex mechanism to elevate a hay buck or fork unit inserted under the bale at ground level to a transport position providing adequate clearance. On the other hand a trailer of relatively simpler construction adapted to engage and lift a large substantially rectangularly shaped commercial refuse container such as disclosed in U.S. Pat. No. 3,357,579 employs a lower edge supported on short foot ground engaging portions which, upon inclination about the trailer wheel pivotal axis, provides only slight elevation above ground level—inadequate ground clearance for hay bale transport, especially over rough terrain of fields in which large ground hay bales are encountered.

Summary of the Present Invention

The present invention provides a relatively simple construction with adequate ground clearance for rough terrain by mounting a right angle cradle having fork elements adapted to extend under a bale from a downwardly inclined right angle mounting in close proximity to the wheel axis descending to ground level points which readily pass under the bale upon backing the trailer and which cradle, upon simple pivotal movement about the axis of the wheels, serves to elevate the round hay bale to a fully adequate ground clearance substantially equal to the radius of the wheels.

Applicant has developed a simple relatively more rigid and rugged structure by employing heavy pipe with 90° vertical and horizontal bends for the cradle construction. Horizontal transverse pipe sections rigidly welded to each side of the pipe cradle and otherwise braced provide pivotal bearings for a through pipe axle for mounting the trailer wheels and forming the main transverse element of the trailer frame.

BRIEF DESCRIPTION OF THE DRAWINGS

FIG. 1 is a side elevation of the bale mover including a cradle pivotally mounted on a pivotal frame;

FIG. 2 is a side elevation of the cradle per se illustrated in FIG. 1;

FIG. 3 is a top elevation of the cradle;

FIG. 4 is a top elevation of the trailer frame.

DESCRIPTION OF THE PREFERRED EMBODIMENT

With reference to FIGS. 1, 2 and 3 the cradle 10 comprises two ten foot lengths of two inch diameter pipe 11 each provided with a 90° vertical bend 12 having a ten inch inside radius and a 90° horizontal bend 13 with like radius joined by welding to a metal strap 14 thus providing fork elements 16, vertical back support elements 17 and horizontal connecting back support elements 18. A twenty inch long three inch I.D. diameter transverse pipe section 19 is welded near its inner end to the cradle pipe above the vertical bend and is rigidly braced by a ⅜" diameter 43" metal rod 20 extending from a forward portion of each fork element to the outer end of each transverse pipe section being welded respectively thereto. An additional ⅜" diameter bracing rod 21 is welded respectively to fork and back support elements of the cradle pipe and each transverse pipe section. A ⅜" by 16" pointed rod 22 projects outwardly from a welded connection with each vertical back support element 17 and brace rod 21 for engaging a bale at an intermediate portion of its height when the forks 16 with pointed ends 23 are slid under a bale preparatory to lifting.

With reference to FIGS. 1 and 4 the trailing unit comprises a rigid frame having a transverse pipe 24 six feet six inches long with a three inch O.D. adapted to provide a pivotal fit with the 3" I.D. sections 19 of the cradle and to provide an axle for mounting a pair of wheels 25. After the axle pipe 24 has been inserted through the respective bearing pipe sections 19, an eight foot six inch long and 2½" diameter longitudinal pipe 26 is connected to the center of the axle 24 by welding to an intermediate 3½"×2"×10" channel 27 which is in turn welded to the pipe 24, such channel serving as a lower central back stop for a loaded bale. The other end of the pipe 26 is connected to a trailer hitch tongue 28 and a pair of five foot six inch pipe brace elements 29 are welded respectfully to the ends of the axle pipe 24 and an intermediate connecting point to the pipe 26 to complete the rigid trailer frame, and thus providing a permanent assembly between cradle and trailer frame. A sixteen inch length of 1½" diameter pipe 30 with a brace element 31 is welded to the longitudinal pipe 26 to provide a stop for the cradle in transport position. Such stop pipe engages a transverse stop plate 32 welded to the bottom of the strap 15 extending downwardly between the ends of the horizontal cradle pipe 18. A winch 33 is connected by cable 34 to the strap 15 moving a loaded cradle to transport position and to secure the same for transport.

To adapt the bale mover for exceptional heavy loads the cradle pipe 11 can be reinforced by a supplemental pipe inside the two forks.

I claim:

1. A large round hay bale mover for trailing use behind a towing vehicle comprising a large round hay bale cradle and a two-wheeled trailing unit, said cradle comprising pipe means formed to provide a pair of straight fork elements adapted to pass in a forward downwardly inclined ground engaging position under its center of gravity and while remaining in ground engaging position to raise to an inclined preliminary fully loaded condition a large round hay bale, the pipe of each fork element having a 90° vertical bend mounted in close proximity to the wheel axis extending therefrom to form back support elements for the bale, and horizontal connecting means extending between said back support elements to provide a further back support, said horizontal connecting means comprising the upper ends of said back support elements provided with transverse bends continuing horizontally and adapted to provide a rigid integral horizontal connecting means, an outwardly extending transverse pipe section rigidly secured to said pipe means in the close proximity of each of said 90° bends, said trailing unit comprising transverse pipe means extending through both of said transverse pipe sections to provide pivotal connections therewith and having trailer frame means connected to said transverse pipe means including means for raising said fork elements adapted for trailing attachment to a towing vehicle with said fork elements raised to an upwardly inclined position providing minimum ground clearance at said 90° bend substantially spaced above the ground contacting wheel perimeter and in close proximity to the wheel axis.

2. A large round hay bale mover as set forth in claim 1 wherein reinforcing rods extend from outward portions of said fork elements to outward portions of said pipe sections.

3. A large round hay bale mover as set forth in claim 2 including reinforcing rods extending in the plane of said 90° vertical bend and rigidly secured to said fork and back support elements and said transverse pipe sections.

4. A large round hay bale mover as set forth in claim 3 including rod projections rigidly secured to said back support elements extending in the direction of said fork elements for engaging a bale at intermediate portions of its height.

5. A large round hay bale mover as set forth in claim 1 wherein said trailing frame means comprises a longitudinal element rigidly connected to the center of said transverse pipe means and extending to the end for attachment to a towing vehicle, a pair of brace elements extending from the ends of said transverse pipe means to an intermediate portion of said longitudinal element with rigid connections.

6. A large round hay bale mover as set forth in claim 5 including a stop means mounted on said longitudinal element, and a cooperating element on said back support for engagement with said stop means when said cradle is pivoted to a transport position.

7. A large round hay bale mover as set forth in claim 6 including winch means mounted on said trailer frame adapted to engage said horizontal connecting means to pivotally raise the fork elements of said cradle to said transport position.

* * * * *